United States Patent [19]
Garrison

[11] 3,830,202
[45] Aug. 20, 1974

[54] PET PULL TOY

[76] Inventor: Elbert W. Garrison, P.O. Box 536, Cave Creek, Ariz. 85331

[22] Filed: May 10, 1973

[21] Appl. No.: 359,136

[52] U.S. Cl. .............................................. 119/29
[51] Int. Cl. ............................................ A01k 15/00
[58] Field of Search ............... 119/29, 29.5; 46/1 R

[56] References Cited
UNITED STATES PATENTS

| | | | |
|---|---|---|---|
| 446,535 | 2/1891 | Outerbridge | 46/1 R |
| 2,032,871 | 3/1936 | Dammeyer | 46/1 R |
| 2,185,547 | 1/1940 | Fowler | 119/29.5 |
| 2,833,244 | 5/1958 | Bohlman | 119/29 |
| 2,941,504 | 6/1960 | Supowitz | 119/29 |
| 3,107,651 | 10/1963 | Beck | 119/29 |
| 3,315,640 | 4/1967 | Gamble | 119/29 |
| 3,476,086 | 11/1969 | Way | 119/29 |
| 3,727,583 | 4/1973 | Muraro | 119/29 |

Primary Examiner—Hugh R. Chamblee
Attorney, Agent, or Firm—Warren F. B. Lindsley

[57] ABSTRACT

A pull toy for pets having a cord extending longitudinally through an axial bore in a cylindrical body which may be grasped by the teeth of a dog, cat or other animal at either end of the cylindrical body. The cord is arranged to slidably move a predetermined distance through the cylindrical body upon tugging of the pet before it is secured to the cylindrical body after which the pet must move the entire weight of the toy.

6 Claims, 4 Drawing Figures

PATENTED AUG 20 1974
3,830,202
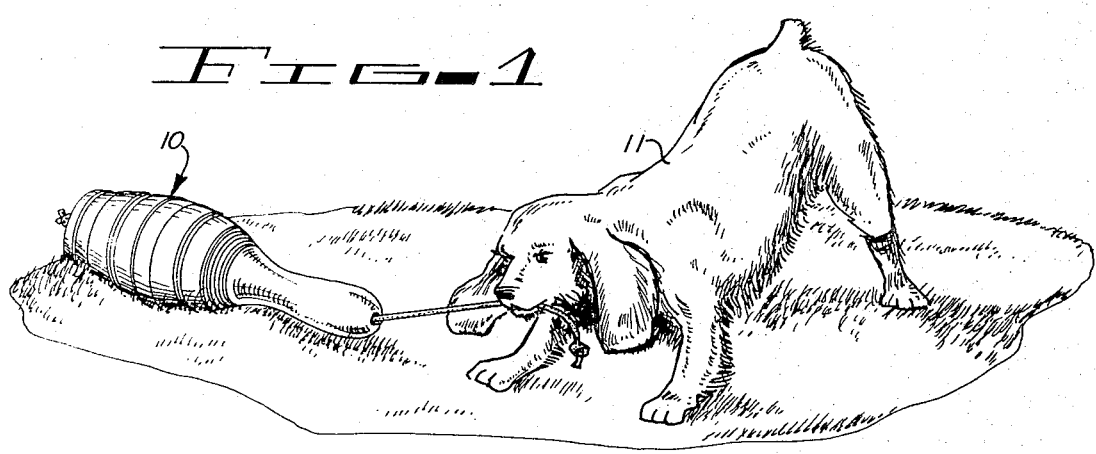
FIG-1
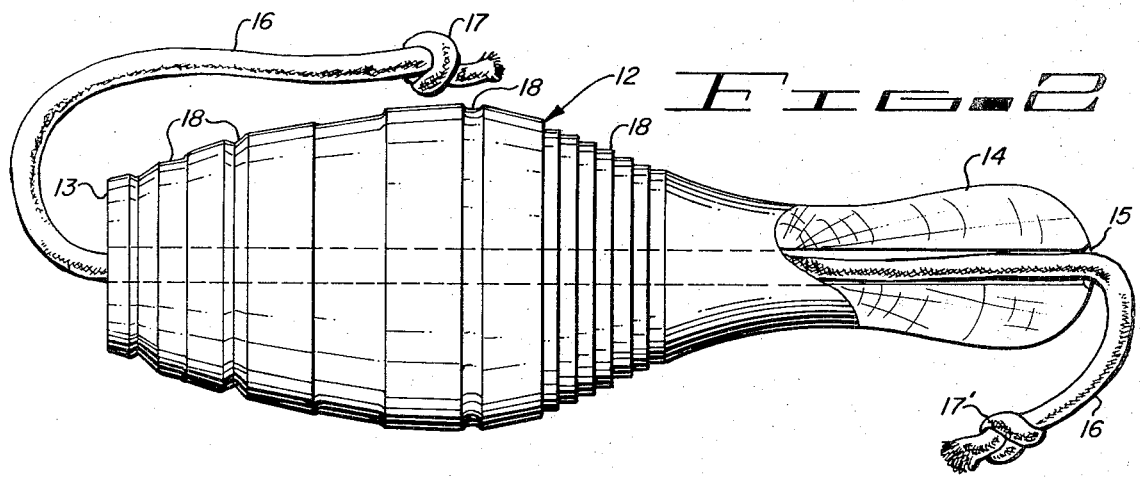
FIG-2
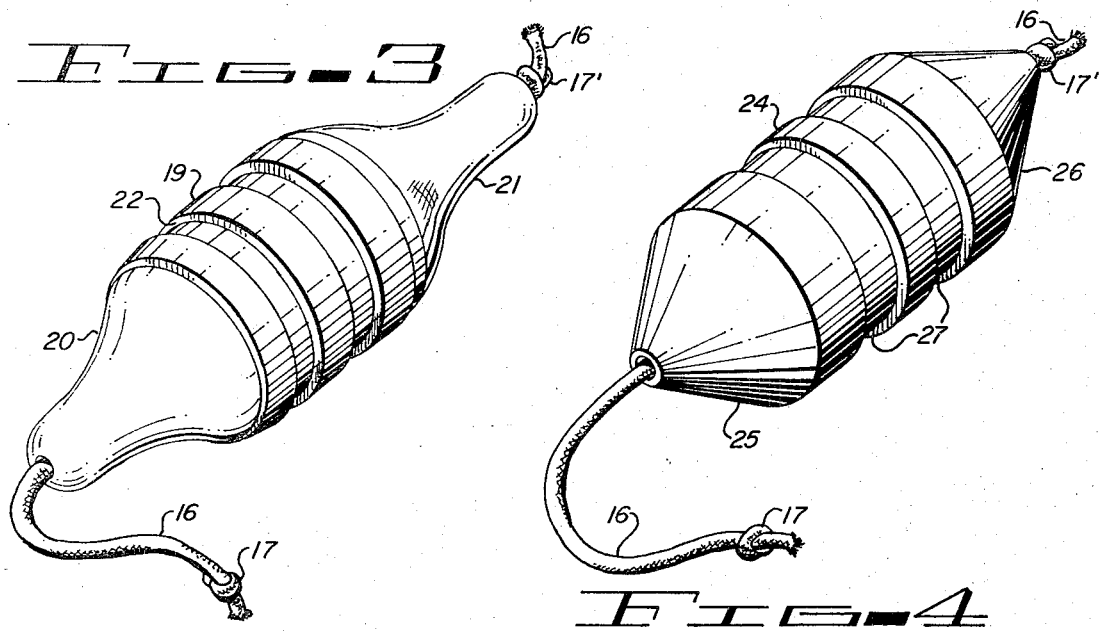
FIG-3
FIG-4

3,830,202

PET PULL TOY

BACKGROUND OF THE INVENTION

This invention relates to toys for the exercise and amusement of animals, particularly dogs and cats.

FIELD OF THE INVENTION

This invention relates to pull toys for animals wherein the toy is grasped by the teeth of the animal and pulled across a relatively flat or rough surface.

DESCRIPTION OF THE PRIOR ART

Heretofore, toys have been provided for animals, particularly dogs, which may be carried in its mouth, such as a rattle, or crushed, such as a rubber object. Other toys have been provided which contain a noise making device and may be rolled along the ground by the pet. Still other devices have been used as a training device for teaching a dog to retrieve.

SUMMARY OF THE INVENTION

In accordance with the invention claimed, a new and improved toy for pets is provided which is intended to amuse the pet, but also satisfy its desire to grasp the toy with its teeth and tug on a moving part which eventually offers sufficient resistance, particularly to small and medium size dogs to keep it from running with the toy. Such a toy, as shown and described, comprises a non-shatterable pull toy made of hardwood, hard rubber or the like which is provided with an axial bore for receiving a nylon cord or rawhide strip extending therethrough which moves a predetermined distance by a tug or the pet before the toy slides over the floor.

It is, therefore, one object of this invention to provide an improved pull toy for pets which amuses the pet, as well as develops its teeth, jaw and body muscles.

Another object of this invention is to provide an improved toy for pets which will incite the curiousity of the animal and may be activated by the animal to slide along the ground offering enough resistance to prove interesting to the animal.

A further object of the invention is to provide a pull toy for pets which has a cord which may be grasped by its teeth from more than one end and then after some movement of the cord, offers substantial resistance to its movement.

A still further object of this invention is to provide an improved pull toy for animals which swings in an arcuate manner whenever it receives a tug on its cord at an angle to the longitudinal axis of the toy.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawing in which:

FIG. 1 is a perspective view of the pull toy with a dog tugging on its pull cord;

FIG. 2 is a front view, partially broken away, of the pull toy shown in FIG. 1 with the pull cord extending from both ends thereof;

FIG. 3 is a modification of the pull toy shown in FIGS. 1 and 2 showing a different body configuration; and FIG. 4 is a further modification of the body structure of the toy shown in FIGS. 1-3.

DESCRIPTION OF THE PREFERRED EMBODIMENT

Referring more particularly to the drawing by characters of reference, FIGS. 1 and 2 illustrate a pull toy 10 for pets, such as for example, a dog 11, which for purposes of amusement and body building and stimulating exercises, needs to tug and pull on relatively heavy objects. This desire is particularly enjoyable to the animal if it can be moved with some resistance.

In accordance with the invention claimed, the pull toy 10 comprises a cylindrical, imperforated body 12 similar to, in some respects, a bowling pin configuration having a large diameter near the center of this longitudinal axis and tapering toward one end to a flat base like surface 13 and toward the other end to a necked down end 14.

A bore 15 is provided along the longitudinal axis of the cylindrical body extending from necked down end 14 to the flat base like surface 13 for loosely receiving a cord 16. The cord may be formed of nylon or any other suitable material, such as a rawhide strip. The ends of the cord are provided with knots 17, 17', as shown, to limit the ends of the cord from being pulled through the cylindrical body.

In order to provide resistance to the movement of the toy over the ground, floor, rug or the like, the outer surface of the cylindrical body is provided with a plurality of grooves 18 of like or dissimilar nature which extend around the cylindrical body in planes perpendicular to the longitudinal axis of the cylindrical body. It should be noted that grooves 18 are irregularly spaced along the longitudinal axis of the cylindrical body to offer resistance to its movement over a smooth or rough surface. The grooves also may be of like or dissimilar shapes.

Since cord 16 is loosely arranged in bore 15, the cord may be pulled by the pet a given distance before the knot at its other end stops further movement of the cord through the toy, as evident from the drawing since the knot is larger than the crosssectional area of the bore.

It is desirable that the toy offer some resistance to its movement across the floor by the pet tugging on the cord. Accordingly, the cylindrical body 12 is usually made of hardwood, like ashwood, or of some form of hard rubber or plastic.

FIGS. 3 and 4 illustrate modification of the cylindrical body 12 shown in FIGS. 1 and 2.

In FIG. 3 the cylindrical body 19 is provided with two necked down ends 20 and 21 of like configuration giving the toy a similar appearance at both ends. The outer circumference of the cylindrical body is grooved at 22 to provide resistance to its movement over uneven ground.

FIG. 4 illustrates a further modification of the pull toy wherein the cylindrical body 24 is provided with tapered ends 25 and 26 of similar configuration similar to frustums of a core with grooves 27 arranged along its length in the manner shown in FIG. 3.

Although but a few embodiments of the present invention have been illustrated and described, it will be apparent to those skilled in the art that various changes and modifications may be made therein without departing from the spirit of the invention or from the scope of the appended claims.

What is claimed is:

1. A pull toy for grasping by the teeth of an animal comprising in combination:
   an elongated body having a bore extending axially therethrough,
   said body having tapered portions extending substantially from its center toward each end thereof, and
   a cord loosely arranged in said bore and extending out of each end of said body,
   said cord being provided with a knot at each end larger than the cross-sectional diameter of said bore,
   said body being provided with grooves spacedly arranged along its length lateral to the longitudinal axis of said body.

2. The pull toy set forth in claim 1 wherein:
   said body is formed of a hardwood material.

3. The pull toy set forth in claim 1 wherein:
   said body is formed of a hard rubber material.

4. The pull toy set forth in claim 1 wherein:
   said body is formed of a plastic material.

5. The pull toy set forth in claim 1 wherein:
   the ends of said body are identical in shape and form frustums of a cone.

6. The pull toy set forth in clain 1 wherein:
   one of said ends is necked-down and the other end is provided with a flat base to form a bowling pin like configuration.

* * * * *